April 27, 1965  J. W. BORGER ETAL  3,180,690
HOPPER SIDE PNEUMATIC DISCHARGE
Filed Nov. 13, 1962  3 Sheets-Sheet 1

INVENTORS
JACK W. BORGER
JACK E. GUTRIDGE
BY Wayne Morris Russell

April 27, 1965 J. W. BORGER ETAL 3,180,690
HOPPER SIDE PNEUMATIC DISCHARGE
Filed Nov. 13, 1962 3 Sheets-Sheet 2

INVENTORS
JACK W. BORGER
JACK E. GUTRIDGE

INVENTORS
JACK W. BORGER
JACK E. GUTRIDGE

United States Patent Office 3,180,690
Patented Apr. 27, 1965

3,180,690
HOPPER SIDE PNEUMATIC DISCHARGE
Jack W. Borger, Calumet City, Ill., and Jack E. Gutridge, Dyer, Ind., assignors to Pullman Incorporated, Chicago, Ill., a corporation of Delaware
Filed Nov. 13, 1962, Ser. No. 237,228
5 Claims. (Cl. 302—52)

The present invention relates to the unloading of covered hopper type vehicles and, more particularly, to an arrangement for unloading granular or pulverulent material therefrom by way of a pneumatic conveying system.

Pneumatic conveying systems are commonly employed for transporting and unloading pulverulent, granular or finely divided material such as grain, cement, plastics, malt and the like to suitable storage receptacles. To accommodate the covered hopper type vehicles to such pneumatic conveying systems, the hoppers at their lower discharge ends are generally provided with a material discharge portion in the form of a housing formed from sloping sheets and include a pneumatic discharge having outlet means projecting from the housing; which outlet means are connected to a suction hose of the pneumatic conveying system.

It is an object of the present invention to provide a new and improved pneumatic feed structure for a hopper which is constructed and arranged such that the connections of the pneumatic suction hoses may be made at the side sheets of the car.

It is a further object to provide a pneumatic feed structure wherein there is provided a material conveying tube having outlet conduits extending therefrom which are accessible at the side walls above the side sills of the hopper car.

It is still a further object taken in conjunction with the immediately foregoing object wherein the outlet conduit is so constructed that the sides of the hopper are employed to form one wall thereof.

It is another object to provide a pneumatic feed structure for a hopper including a generally V-shaped discharge portion of which one side of the discharge portion is provided with a discharge gate for gravity discharge of the pulverulent material and wherein a pneumatic discharge or pulverulent intake tube extends through said housing transversely of said car and includes optional outlet openings at either end thereof and further includes optional outlet conduits communicating with the discharge tube and accessible above at the side walls above the side sill of the hopper car.

Further objects and features will hereinafter appear.

In the drawings:

FIG. 8 is a schematic plan view of the general arrangement of the pneumatic outlets in a covered hopper car having three side-by-side hoppers; the hopper car being shown in phantom.

Figure 1:
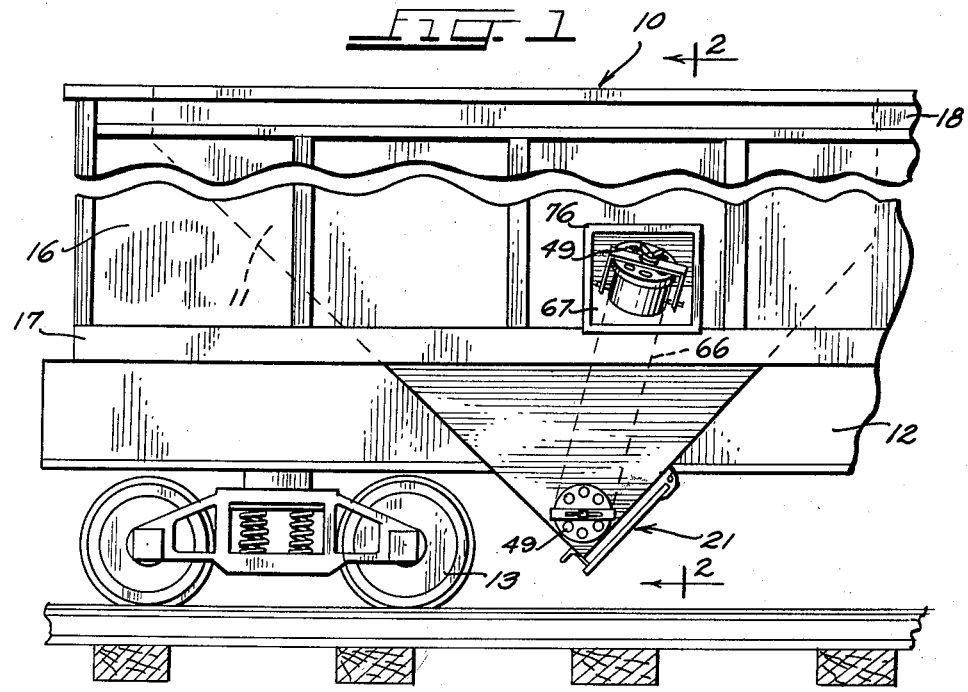
FIG. 1 is a fragmentary side elevational view of a railway hopper car showing a hopper discharge arrangement embodying the present invention.

Referring now to the figures, in particular FIGS. 1 and 8, there is illustrated a more or less conventionally constructed hopper car 10 having a plurality of longitudinally aligned hoppers 11. The hopper car 10 includes generally a center sill 12 supporting the usual bolsters (not shown) to which the trucks 13 are fastened; end sills 14 and sides formed by side sheets 16 fixed between the side sills 17 and side plates 18.

The hoppers 11 are substantially identical in structure each being formed by the sides 16 and include converging floor sheets 19. The lower ends of the hoppers are provided with a discharge section 21. Each of the discharge sections 21 includes side slope sheets 22 fixed along their upper ends to the side sheets 16 and sloping floor plates 23 fixed to the floor sheets 19 and along the side edges to the slope sheets 22. The discharge portion 21 forms a substantially V-shaped housing of which the nadir 24 projects below the center sill 12 transversely of the car.

In the embodiment shown the floor plate 23 is fixed to the floor sheet as by welding in abutting relation along a line substantially coplanar with the top of the center sill 12, it being understood that the floor plate may be integral with the floor sheet. Overlying the floor plate 23 are closure plates 26 which serve to close the openings formed in the former for accommodating the center sill 12 extending through the floor plate 23.

A bottom plate 27 may be fixed across the flanges of the center sill 12 to prevent an accumulation of the pulverulent material within the center sill hollow. To facilitate the flow of the material a substantially triangularly bent plate 28 is fixed across the top of the center sill 12 portion disposed within the hopper discharge portion 21 and flow plates 29 are fixed along the sides of the center sill 12 as shown in FIG. 2.

Figure 2:
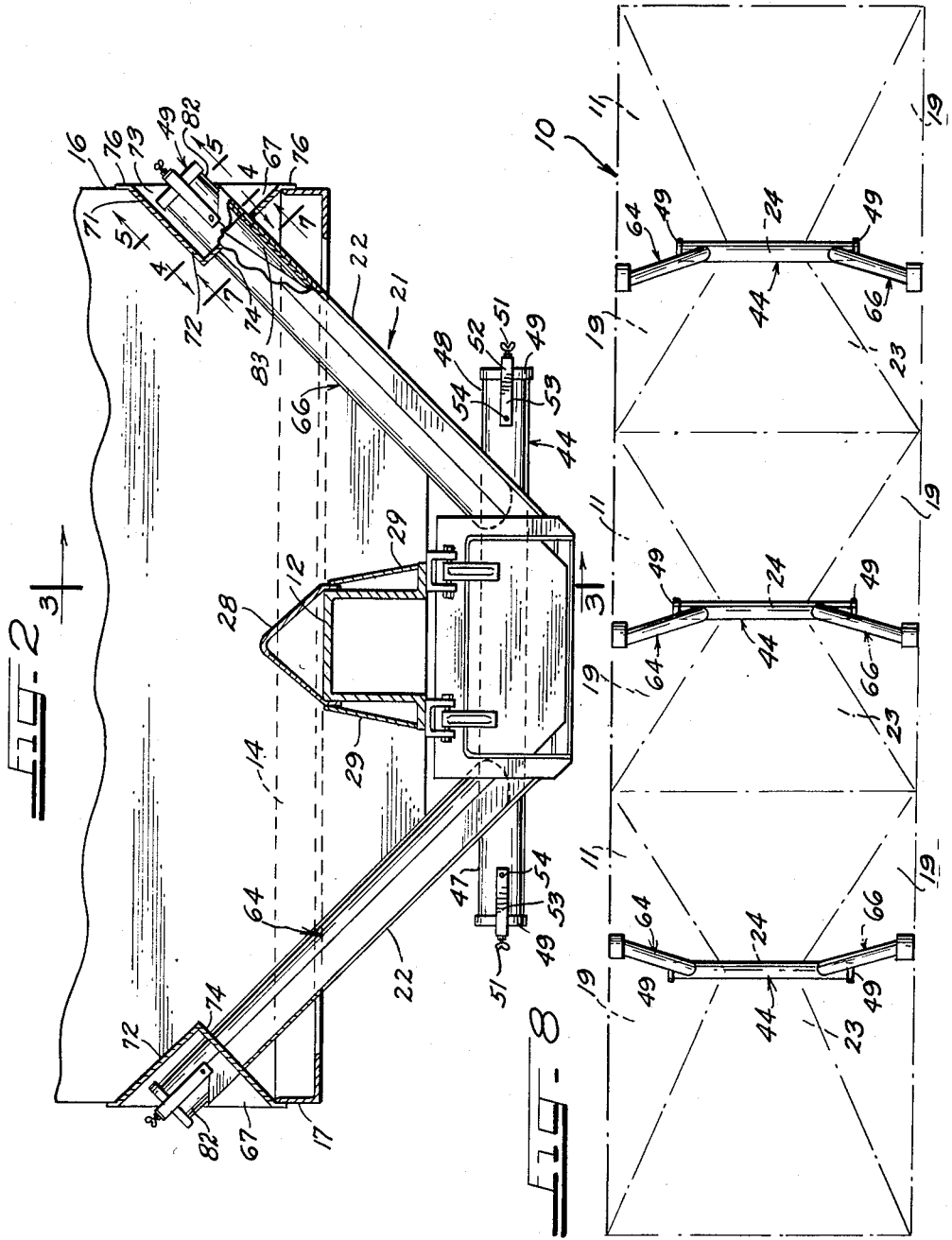
FIG. 2 is a cross-sectional view taken substantially along the lines 2—2 of FIG. 1 with some of the parts being broken away to show underlying details of structure.

As shown in FIG. 2 the slope sheets 22 are fixed at the upper ends thereof as by welding to the side sheets 16 along a line somewhat above the side sill 17. Flanges 31 are formed along the side edges of the slope sheets 22 and underlie the floor plates 23 which are fastened thereto as by welding.

Figure 3:
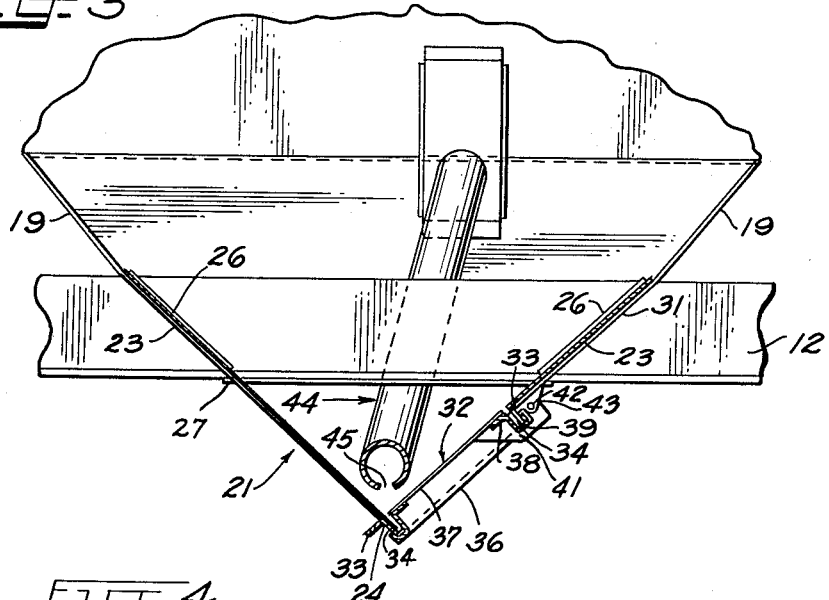
FIG. 3 is a cross-sectional view taken substantially along the lines 3—3 of FIG. 2.
Figure 4:
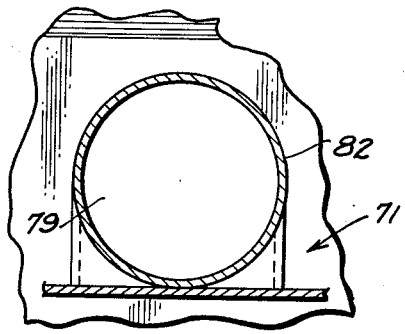
FIG. 4 is a cross-sectional view taken substantially along the lines 4—4 of FIG. 2.
Figure 5:
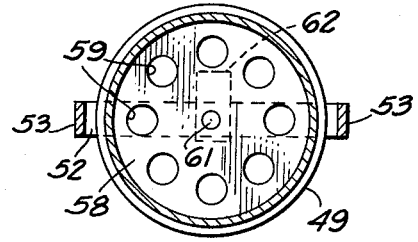
FIG. 5 is a cross-sectional view taken substantially along the lines 5—5 of FIG. 2.
Figure 6:
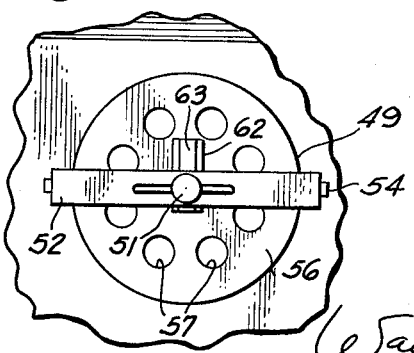
FIG. 6 is a view of the cap closure for the outlet conduits.
Figure 7:
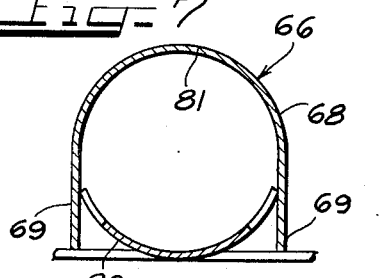
FIG. 7 is a cross-sectional view taken substantially along the lines 7—7 of FIG. 2.

In accordance with the present invention one of the floor plates 19 is provided with a discharge opening 32 for permitting gravity discharge of the hopper 11. Bounding the opening 32 and fixed to the floor plates 22 and side sheets 23 as shown in FIGS. 2 and 3 are angle members 33 arranged to provide outwardly projecting legs 34.

Covering the opening is a gate 36 including a plate 37 which in the closed position forms a continuation of the floor plate 22. Secured about the periphery of the plate 37 are Z-shaped angle members 38 of which the outer leg is crimped adjacent its free end to form a hook like rim 39 which in the closed position of the gate receives the projecting legs 34 of the angle members 33. Fixed to the upper edge of the plate 37 is a pair of spaced hinge plates 41 which extend about and over the rim strip 39 and are pivotally attached by hinge pins 42 fixed to clevis type hinges 43 carried advantageously on the bottom plate 27 of the center sill 12.

For gravity discharge the plate 37 is swung downwardly with the edge of the angle brace 33 in engagement with a surface portion of the rim strips 39 providing a pivot point in cooperation with the hinge pins 42 so that gravity discharge occurs through the opening 32. In the closed condition of the plate 37 the edge of the angle 33 engaging the interior of the rim strip 39 serves as a seal to prevent loss of material therethrough. The plate may be locked in its closed position by any suitable means, such as a conventional car seal (not shown).

Extending through the discharge portion 21 and supported by the slop sheets 22 so that the longitudinal axis thereof is parallel to the nadir 24 of housing 71 is a discharge tube 44. The discharge tube 44 is preferably of substantially circular section. Formed on the bottom side of the tube 44 is a material entrance slot 45 spanning between the opposite slope sheets 22. The tube 44 is located and arranged so as to provide adequate space for the pulverulent material to flow between the periphery thereof and the floor plates 23 and is spaced above the nadir 24 so that material flowing therein is free to be drawn upwardly under the influence of the suction applied thereto as more fully to be explained hereinafter.

The projecting ends 47 and 48 of the discharge or suction feed tube 44 are each provided with a removable closure means which in the form illustrated is in the form of a cap 49 held in place by a clamp screw 51 carried on a pivotal bracket 52 having leg portions 53 extending inwardly along opposite side portions of the tube 44 and pivotally attached thereto by stub shaft members 54 fixedly attached to the tube 44.

Advantageously each of closure members 49 may be constructed so as to provide means for controlling the admittance of air in the discharge tube and thereby control the rate of feed of the pulverulent material in the well-known manner. To this end the top 56 of the cap 49 is provided with a plurality of openings 57 and disposed on the inner side of the top 56 is a rotatable disc 58 having a plurality of openings 59 complementary to the cover openings 57. Rotatably securing the disc 58 to the top 56 so as to close or selectively vary the effective area of the openings 57 is a stud 61 on the outer end of which there is fixed a slotted turning knob 62. As shown, the slot 63 in the knob 62 receives the thumb screw 51 of the bail 52.

Frequently it is desirable and advantageous to have the pneumatic feed connections accessible at a level above the height of the loading docks at which the material may be discharged. When the pneumatic feed outlets are thus located it precludes the necessity of a laborer crawling under the car and making the connection of the usual pneumatic feed suction tube with the pneumatic discharge tube.

In accordance with the present invention there is provided a new and novel discharge conduit system wherein the connections may be made along each of the side walls. As shown this is accomplished by providing discharge conduits 64 and 66 extending along the respective slope sheets 22 and communicating at one end with the transverse pneumatic discharge tube 44 and at the other end thereof extending upwardly above the respective side sills 16 and being accessible at the side in a recessed portion 67 formed therein.

Each of the discharge conduits 64 and 66 includes a section 68 extending between the recessed portion 67 and the connection to the pneumatic discharge or material intake tube 44 formed of a substantially inverted U-shaped member of which the terminal ends of legs 69 are welded to the slope sheet 22. In this manner the inner wall of the slope sheets forms a wall of the conduit 64. This construction is preferable within the discharge portion of the hopper 11, particularly when pulverulent materials which tend to cake or form conglomerates are being discharged. When such material is being discharged the outer contour of the discharge conduit sections as described above is smooth and uninterrupted so as not to provide any crevices or sharply changing surfaces into which the material may become lodged and set up caking conditions.

Each of the recessed portions 67 in the side walls is in the form of a housing 71 disposed in openings in the side sheets 16 and includes a right angularly bent plate 72 having a leg 73 and a leg 74. Extending from the legs are bent attachment flanges 76 which are fixed as by welding to the side sheet 16. Side members 77 are fixed as by welding to the respective side edges of the legs 73 and 74 and the side members include bent flanges 78 overlying and fixed to the side sheet. In this manner the housing 71 seals the side sheet opening.

The leg 73 of each of the housings 71 is formed with a substantially circular opening arranged coaxial with the semi-circular bight portion 81 of the discharge conduit section 64. Fixed to the outer surface of leg 73 in coaxial relationship with the opening is a cylindrical tube 82 to which the suction tube of the pneumatic feed system is adapted to be attached. The leg opening 79, the bight portion 81 of the conduit section 73 and the cylindrical tube 82 are each of equal radius to provide a smooth passage of the material through the discharge conduit. To further assure smooth uninterrupted surfaces in the juncture of the inverted U-shaped section with the housing leg 73, there is a curved transitional plate 83 arranged so as to provide a gradual transition of the U-shaped cross-sectional area of the discharge section 62 within the hopper 11 and the cylinder tube 82 located in the housing 71.

The open ends of the discharge conduits 64 and 66 are each covered by a removable cap member 49 which may be constructed identically to the cap structures on the material intake tube and may include the adjustable air intake structure.

In operation any one of the four outlet ends of the pneumatic intake tube 44 and of the discharge conduits 64 may be uncapped and the suction tube of the pneumatic feed system to control the rate of feed of the pulverulent material from the hopper and through the discharge conduit system the venting or intake of any one of the three remaining capped outlet connections may be adjusted as heretofore described.

What is claimed is:

1. In a railway hopper car having a side sill and sides extending upwardly therefrom and a hopper discharge portion depending below said side sill, said hopper discharge portion being formed as a housing of substantially V-shaped cross-section and including floor sheet means tapered inwardly toward each other to form the nadir of said housing and slope sheets forming the end walls thereof, said housing extending transversely of said car, a pneumatic material intake and discharge tube extending through said housing substantially parallel to said nadir and having each of its ends projecting through said slope sheets providing connecting portions adapted to receive the suction tubes of a pneumatic conveying system, and a discharge conduit extending along each of said slope sheets, said discharge conduits each connecting at one end with said intake and discharge tube and having an end projecting through said car sides within the confines of said hoppers for providing a connection to a suction tube.

2. The invention as defined in claim 1 wherein said discharge conduits each include a hood extending along said respective slope sheet so that one wall thereof is formed by said slope sheet.

3. In a railway hopper car having a side sill and sides extending upwardly therefrom and a hopper discharge portion depending below said side sill, said hopper discharge portion being formed as a housing of substantially V-shaped cross-section and including floor sheet means tapered inwardly toward each other to form the nadir of said housing and slope sheets forming the end walls thereof, said housing extending transversely of said car, a pneumatic intake and discharge tube extending through said housing substantially parallel to said nadir and having each of its ends projecting through said slope sheets providing connecting portions adapted to receive the suction tubes of a pneumatic conveying system and a discharge conduit extending along respective ones of each of said slope sheets, said discharge conduits each having one side thereof formed by said respective slope sheet and an end projecting through said car sides above said side sills within the confines of said hopper for providing a connection to a suction tube, said other end of each of said discharge conduits communicating with said intake and discharge tube.

4. In a railway hopper car having a side sill and sides extending upwardly therefrom and a hopper discharge portion depending below said side sill, said hopper discharge portion being formed as a housing of substantially V-shaped cross-section and including floor sheet means tapered inwardly toward each other to form the nadir of said housing and slope sheets forming the end walls thereof, said housing extending transversely of said car, a pneumatic intake and discharge tube extending through said housing substantially parallel to said nadir and having each of its ends projecting through said slope sheets providing connecting portions adapted to receive the suction tubes of a pneumatic conveying system, and discharge conduit of substantially rectangular section extending along the respective ones of each of said slope sheets and having one wall thereof formed by said slope sheets, said discharge conduit means each having an end projecting through said car sides for providing a connection to a suction tube, said discharge conduits communicating with said intake and discharge tube.

5. The invention as defined in claim 4 wherein said projecting ends of said discharge conduits are of substantially circular section and include a transitional portion merging with said rectilinear portions.

References Cited by the Examiner
UNITED STATES PATENTS

| | | | |
|---|---|---|---|
| 2,030,553 | 2/36 | Tiley | 302—52 |
| 2,919,158 | 2/59 | Aller | 302—52 |
| 3,088,778 | 5/63 | Aller | 302—52 |

SAMUEL F. COLEMAN, *Acting Primary Examiner.*

ANDRES H. NIELSEN, *Examiner.*